(12) United States Patent
Chen et al.

(10) Patent No.: US 11,693,210 B2
(45) Date of Patent: Jul. 4, 2023

(54) CAMERA OPTICAL LENS

(71) Applicant: AAC Optics (Changzhou) Co., Ltd., Changzhou (CN)

(72) Inventors: Jia Chen, Shenzhen (CN); Wen Sun, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 404 days.

(21) Appl. No.: 17/134,182

(22) Filed: Dec. 25, 2020

(65) Prior Publication Data
US 2022/0050263 A1 Feb. 17, 2022

(30) Foreign Application Priority Data
Aug. 12, 2020 (CN) .......................... 202010804024.8

(51) Int. Cl.
*G02B 9/60* (2006.01)
*G02B 13/18* (2006.01)

(52) U.S. Cl.
CPC ............... *G02B 9/60* (2013.01); *G02B 13/18* (2013.01)

(58) Field of Classification Search
CPC ...... G02B 9/60; G02B 13/18; G02B 13/0045; G02B 13/06
See application file for complete search history.

(56) References Cited

U.S. PATENT DOCUMENTS

| 2013/0170048 A1* | 7/2013 | Lai | ..................... | G02B 13/0045 359/714 |
| 2014/0126073 A1* | 5/2014 | Tsai | ................... | G02B 13/0045 359/764 |

* cited by examiner

*Primary Examiner* — Robert E. Tallman
(74) *Attorney, Agent, or Firm* — W&G Law Group (57) ABSTRACT

The present invention provides a camera optical lens, including, from an object side to an image side, a first lens having a positive refractive power, a second lens a negative refractive power, a third lens having a positive refractive power, a fourth lens having a negative refractive power, and a fifth lens. At least one of the first lens to the fifth lens has a free-form surface, and the camera optical lens satisfies $0.50 \leq f3/f \leq 1.20$; and $1.50 \leq R7/R8$, where f denotes a focal length of the camera optical lens, f3 denotes a focal length of the third lens, R7 is a central curvature radius of an object side surface of the fourth lens, and R8 is a central curvature radius of an image side surface of the fourth lens. The camera optical lens has excellent optical performance while meeting requirements of a long focal length and ultra-thinness.

10 Claims, 8 Drawing Sheets

CAMERA OPTICAL LENS

TECHNICAL FIELD

The present invention relates to the field of optical lenses, and more particularly, to a camera optical lens suitable for portable terminal devices such as smart phones and digital cameras, and for imaging devices such as monitors and PC lenses.

BACKGROUND

With the development of camera lenses, higher and higher requirements are put forward for imaging quality of the lenses. The "night scene photography" and "bokeh" of the lens have also become important indexes to measure the imaging performances of the lens. At present, rotationally symmetric aspherical surfaces are mostly used. Such an aspherical surface has a sufficient degree of freedom only in a meridian plane, and cannot well correct off-axis aberration. The existing structures have insufficient refractive power allocation, lens spacing and lens shape settings, resulting in insufficient ultra-thinness and insufficient long focal length of the lenses. A free-form surface is a non-rotationally symmetric surface, which can better balance aberration and improve the imaging quality; besides, processing of the free-form surface has gradually become mature. With the increasing requirements for imaging of the lens, it is very important to provide a free-form surface in the design of a lens, especially in the design of wide-angle and ultra-wide-angle lenses.

SUMMARY

In view of the above-mentioned problems, a purpose of the present invention is to provide a camera optical lens, which has excellent optical performance while having the characteristics of a long focal length and ultra-thinness.

In order to solve the above-mentioned technical problem, an embodiment of the present invention provide a camera optical lens, including, from an object side to an image side, a first lens having a positive refractive power, a second lens a negative refractive power, a third lens having a positive refractive power, a fourth lens having a negative refractive power, and a fifth lens. At least one of the first lens to the fifth lens has a free-form surface, and the camera optical lens satisfies following conditions: $0.50 \leq f3/f \leq 1.20$; and $1.50 \leq R7/R8$, where f denotes a focal length of the camera optical lens, f3 denotes a focal length of the third lens, R7 denotes a central curvature radius of an object side surface of the fourth lens, and R8 denotes a central curvature radius of an image side surface of the fourth lens.

In an improved embodiment, the camera optical lens further satisfies following conditions: $2.50 \leq d1/d2 \leq 15.00$, where d1 denotes an on-axis thickness of the first lens, and d2 denotes an on-axis distance from an image side surface of the first lens to an object side surface of the second lens.

In an improved embodiment, the camera optical lens further satisfies following conditions: $0.20 \leq f1/f \leq 0.76$; $-1.47 \leq (R1+R2)/(R1-R2) \leq -0.31$; and $0.08 \leq d1/TTL \leq 0.36$, where f1 denotes a focal length of the first lens, R1 denotes a central curvature radius of an object side surface of the first lens, R2 denotes a central curvature radius of an image side surface of the first lens, d1 denotes an on-axis thickness of the first lens, and TTL denotes a total optical length from the object side surface of the first lens to an image plane of the camera optical lens along an optic axis.

In an improved embodiment, the camera optical lens further satisfies following conditions: $-1.08 \leq f2/f \leq -0.32$; $0.10 \leq (R3+R4)/(R3-R4) \leq 0.64$; and $0.02 \leq d3/TTL \leq 0.06$, where f2 denotes a focal length of the second lens, R3 denotes a central curvature radius of an object side surface of the second lens, R4 denotes a central curvature radius of an image side surface of the second lens, d3 denotes an on-axis thickness of the second lens, and TTL denotes a total optical length from an object side surface of the first lens to an image plane of the camera optical lens along an optic axis.

In an improved embodiment, the camera optical lens further satisfies following conditions: $-0.71 \leq (R5+R6)/(R5-R6) \leq 1.58$; and $0.03 \leq d5/TTL \leq 0.13$, where R5 denotes a central curvature radius of an object side surface of the third lens, R6 denotes a central curvature radius of an image side surface of the third lens, d5 denotes an on-axis thickness of the third lens, and TTL denotes a total optical length from an object side surface of the first lens to an image plane of the camera optical lens along an optic axis.

In an improved embodiment, the camera optical lens further satisfies following conditions: $-7.00 \leq f4/f \leq -0.26$; $0.53 \leq (R7+R8)/(R7-R8) \leq 6.60$; and $0.02 \leq d7/TTL \leq 0.10$, where f4 denotes a focal length of the fourth lens, d7 denotes an on-axis thickness of the fourth lens, and TTL denotes a total optical length from an object side surface of the first lens to an image plane of the camera optical lens along an optic axis.

In an improved embodiment, the camera optical lens further satisfies following conditions: $-5.26 \leq f5/f \leq 7.26$; $-3.24 \leq (R9+R10)/(R9-R10) \leq 10.20$; and $0.04 \leq d9/TTL \leq 0.17$, where f5 denotes a focal length of the fifth lens, R9 denotes a central curvature radius of an object side surface of the fifth lens, R10 denotes a central curvature radius of image side surface of the fifth lens, d9 denotes an on-axis thickness of the fifth lens, and TTL denotes a total optical length from an object side surface of the first lens to an image plane of the camera optical lens along an optic axis.

In an improved embodiment, the camera optical lens further satisfies a following condition: $f/TTL \geq 1.00$, where TTL denotes a total optical length from an object side surface of the first lens to an image plane of the camera optical lens along an optic axis.

In an improved embodiment, a total optical length from an object side surface of the first lens to an image plane of the camera optical lens along an optic axis is smaller than or equal to 8.59 mm.

In an improved embodiment, an F number of the camera optical lens is smaller than or equal to 2.47.

The present invention has at least the following beneficial effects. The camera optical lens according to the present invention has excellent optical performance while having the characteristics of a long focal length and ultra-thinness. Meanwhile, at least one of the first lens to the fifth lens has a free-form surface, which is beneficial to correct distortion and field curvature of the system and improve the imaging quality of the optical system, and is especially suitable for the mobile phone camera lens assembly and the WEB camera lens composed of imaging elements such as CCD and CMOS for high pixels.

BRIEF DESCRIPTION OF DRAWINGS

In order to more clearly illustrate technical solutions in embodiments of the present invention, the accompanying drawings used in the embodiments are briefly introduced as follows. It should be noted that the drawings described as follows are merely part of the embodiments of the present invention, and other drawings can also be acquired by those skilled in the art without paying creative efforts.

DESCRIPTION OF EMBODIMENTS

In order to better illustrate the purpose, technical solutions and advantages of the present invention, the embodiments of the present invention will be described in detail below with reference to the accompanying drawings. However, it should be understood by those skilled in the art that, technical details are set forth in the embodiments of the present invention so as to better illustrate the present invention, rather than to limit the present invention.

Embodiment 1

Figure 1:
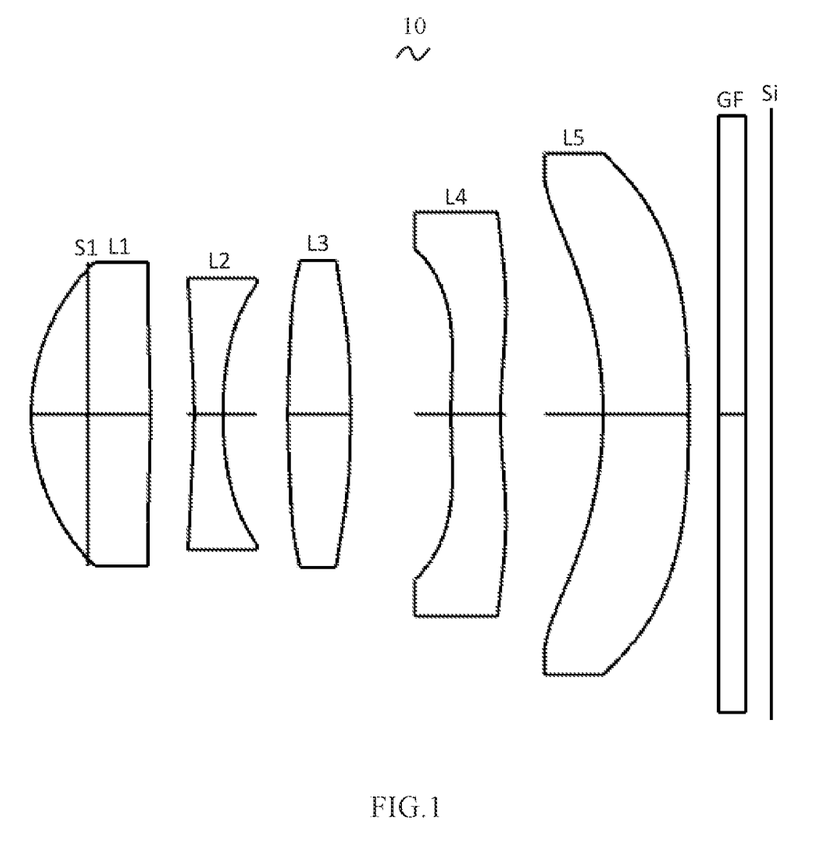
FIG. 1 is a schematic structural diagram of a camera optical lens according to a Embodiment 1 of the present invention.

With reference to the accompanying drawings, the present invention provides a camera optical lens 10. FIG. 1 illustrates a camera optical lens 10 according to Embodiment 1 of the present invention. The camera optical lens 10 includes five lenses. Specifically, the camera optical lens 10 includes, from an object side to an image side, an aperture S1, a first lens L1, a second lens L2, a third lens L3, a fourth lens L4, and a fifth lens L5. Optical elements such as an optical filter GF may be arranged between the fifth lens L5 and an image plane Si.

In this embodiment, the first lens L1 is made of a plastic material, the second lens L2 is made of a plastic material, the third lens L3 is made of a plastic material, the fourth lens L4 is made of a plastic material, and the fifth lens L5 is made of a plastic material. In other embodiments, the lenses may be made of other materials.

In this embodiment, at least one of the first lens L1 to the fifth lens L5 includes a free-form surface, and the free-form surface is beneficial to correct distortion and field curvature of the system, and improve imaging quality.

It is defined that a focal length of the camera optical lens 10 is denoted by f, a focal length of the third lens L3 is denoted by f3, and the camera optical lens 10 satisfies the following condition: $0.50 \leq f3/f \leq 1.20$, which specifies a ratio of the focal length of the third lens to the total focal length of the camera optical lens. Within a range defined by this condition, it is beneficial to improve the imaging quality.

It is defined that a central curvature radius of an object side surface of the fourth lens L4 is denoted by R7, a central curvature radius of an image side surface of the fourth lens is denoted by R8, and the camera optical lens further satisfies the following condition: $1.50 \leq R7/R8$, which specifies a shape of the fourth lens. Within a range defined by this condition, it is beneficial to reducing a degree of light deflection and improving the imaging quality.

It is defined that an on-axis thickness of the first lens L1 is d1, an on-axis distance from an image side surface of the first lens L1 to an object side surface of the second lens L2 is d2, and the camera optical lens further satisfies the following condition: $2.50 \leq d1/d2 \leq 15.00$. Within a range defined by this condition, it is beneficial to reduce a total length of the system.

In this embodiment, the first lens L1 has positive refractive power, an object side surface of the first lens L1 is a protruded surface at a paraxial position, and an image side surface of the first lens L1 is a protruded surface at a paraxial position.

It is defined that a focal length of the first lens L1 is denoted by f1, the focal length of the camera optical lens 10 is denoted by f, and the camera optical lens further satisfies the following condition: $0.20 \leq f1/f \leq 0.76$, which specifies a ratio of the focal length of the first lens L1 to the focal length of the system. Within a range defined by this condition, the first lens has appropriate positive refractive power, which is beneficial to reduce aberration of the system. As an example, the camera optical lens further satisfies the following condition: $0.31 \leq f1/f \leq 0.61$.

A central curvature radius of the object side surface of the first lens L1 is denoted by R1, a central curvature radius of the image side surface of the first lens L1 is denoted by R2, and the camera optical lens further satisfies the following condition: $-1.47 \leq (R1+R2)/(R1-R2) \leq -0.31$. By reasonably controlling a shape of the first lens L1, the first lens L1 can effectively correct spherical aberration of the system. As an example, the camera optical lens further satisfies the following condition: $-0.92 \leq (R1+R2)/(R1-R2) \leq -0.39$.

An on-axis thickness of the first lens L1 is denoted by d1, a total optical length from an object side surface of the first lens to an image plane of the camera optical lens 10 along an optic axis is denoted by TTL, and the camera optical lens further satisfies the following condition: $0.08 \leq d1/TTL \leq 0.36$. Within a range defined by this condition, it is beneficial to achieve ultra-thinness. As an example, the camera optical lens further satisfies the following condition: $0.13 \leq d1/TTL \leq 0.29$.

In this embodiment, the second lens L2 has negative refractive power, an object side surface of the second lens L2 is a concave surface at a paraxial position, and an image side surface of the second lens L2 is a concave surface at a paraxial position.

It is defined that a focal length of the second lens L2 is denoted by f2, the focal length of the camera optical lens 10 is denoted by f, and the camera optical lens further satisfies the following condition: $-1.08 \leq f2/f \leq -0.32$. By controlling the negative refractive power of the second lens L2 within a reasonable range, it is beneficial to correct aberration of the optical system. As an example, the camera optical lens further satisfies the following condition: $-0.67 \leq f2/f \leq -0.40$.

A central curvature radius of the object side surface of the second lens L2 is denoted by R3, a central curvature radius of the image side surface of the second lens L2 is denoted by R4, and the camera optical lens further satisfies the following condition: 0.10≤(R3+R4)/(R3−R4)≤0.64, which specifies a shape of the second lens L2. Within a range defined by this condition, it is beneficial to correct longitudinal aberration. As an example, the camera optical lens further satisfies the following condition: 0.16≤(R3+R4)/(R3−R4)≤0.51.

An on-axis thickness of the second lens L2 is denoted by d3, the total optical length from the object side surface of the first lens to an image plane of the camera optical lens 10 along the optic axis is denoted by TTL, and the camera optical lens further satisfies the following condition: 0.02≤d3/TTL≤0.06. Within a range defined by this condition, it is beneficial to achieve ultra-thinness. As an example, the camera optical lens further satisfies the following condition: 0.03≤d3/TTL≤0.05.

In this embodiment, the third lens L3 has a positive refractive power, an object side surface of the third lens L3 is a convex surface at a paraxial position, and an image side surface of the third lens L3 is a convex surface at a paraxial position.

It is defined that a central curvature radius of the object side surface of the third lens L3 is denoted by R5, a central curvature radius of the image side surface of the third lens L3 is denoted by R6, and the camera optical lens further satisfies the following condition: −0.71≤(R5+R6)/(R5−R6) ≤1.58, which specifies a shape of the third lens. Within a range defined by this condition, it is beneficial to alleviate a degree of deflection of light passing through the lens, and effectively reducing aberration. As an example, the camera optical lens further satisfies the following condition: −0.44≤ (R5+R6)/(R5−R6)≤1.26.

An on-axis thickness of the third lens L3 is d5, the total optical length from the object side surface of the first lens to an image plane of the camera optical lens 10 along the optic axis is denoted by TTL, and the camera optical lens further satisfies the following condition: 0.03≤d5/TTL≤0.13. Within a range defined by this condition, it is beneficial to achieve ultra-thinness. As an example, the camera optical lens further satisfies the following condition: 0.04≤d5/TTL≤0.10.

In this embodiment, the fourth lens L4 has a negative refractive power, an object side surface of the fourth lens L4 is a convex surface at a paraxial position, and an image side surface of the fourth lens L4 is a concave surface at a paraxial position.

It is defined that a focal length of the fourth lens L4 is denoted by f4, the focal length of the camera optical lens 10 is denoted by f, and the camera optical lens further satisfies the following condition: −7.00≤f4/f≤−0.26, which specifies a ratio of the focal length of the fourth lens to the focal length of the system. Within a range defined by this condition, it is beneficial to improve the performance of the optical system. As an example, the camera optical lens further satisfies the following condition: −4.37≤f4/f≤−0.33.

A central curvature radius of the object side surface of the fourth lens L4 is denoted by R7, a central curvature radius of the image side surface of the fourth lens L4 is denoted by R8, and the camera optical lens further satisfies the following condition: 0.53≤(R7+R8)/(R7−R8)≤6.60, which specifies a shape of the fourth lens L4. Within a range defined by this condition, it is beneficial to correct off-axis aberration. As an example, the camera optical lens further satisfies the following condition: 0.85≤(R7+R8)/(R7−R8)≤5.28.

An on-axis thickness of the fourth lens L4 is denoted by d7, the total optical length from the object side surface of the first lens to an image plane of the camera optical lens 10 along the optic axis is denoted by TTL, and the camera optical lens further satisfies the following condition: 0.02≤d7/TTL≤0.10. Within a range defined by this condition, it is beneficial to achieve ultra-thinness. As an example, the camera optical lens further satisfies the following condition: 0.03≤d7/TTL≤0.08.

In this embodiment, the fifth lens L5 has negative refractive power, an object side surface of the fifth lens L5 is a concave surface at a paraxial position, and an image side surface of the fifth lens L5 is a convex surface at a paraxial position.

It is defined that a focal length of the fifth lens L5 is denoted by f5, the focal length of the camera optical lens 10 is denoted by f, and the camera optical lens further satisfies the following condition: −5.26≤f5/f≤7.26. The limitation on the fifth lens L5 can effectively smooth a light angle of the camera lens and reduce tolerance sensitivity. As an example, the camera optical lens further satisfies the following condition: −3.28≤f5/f≤5.81.

A central curvature radius of the object side of the fifth lens is denoted by R9, a central curvature radius of the image side of the fifth lens is denoted by R10, and the camera optical lens further satisfies the following condition: −3.24≤ (R9+R10)/(R9−R10)≤10.20, which specifies a shape of the fifth lens L5. Within a range defined by this condition, it is beneficial to correct off-axis aberration. As an example, the camera optical lens further satisfies the following condition: −2.02≤(R9+R10)/(R9−R10)≤8.16.

An on-axis thickness of the fifth lens L5 is d9, the total optical length from an object side surface of the first lens to an image plane of the camera optical lens 10 along the optic axis is denoted by TTL, and the camera optical lens further satisfies the following condition: 0.04≤d9/TTL≤0.17. Within a range defined by this condition, it is beneficial to achieve ultra-thinness. As an example, the camera optical lens further satisfies the following condition: 0.07≤d9/TTL≤0.14.

In this embodiment, a focal length of the camera optical lens 10 is denoted by f, the total optical length from the object side surface of the first lens to an image plane of the camera optical lens 10 along the optic axis is denoted by TTL, and the camera optical lens further satisfies the following condition: f/TTL≥1.00, so that ultra-thinness can be achieved.

In this embodiment, the total optical length TTL of the camera optical lens 10 is smaller than or equal to 8.59 mm, so that it is beneficial to achieve ultra-thinness. As an example, the total optical length TTL of the camera optical lens 10 is smaller than or equal to 8.20 mm.

In this embodiment, an F number FNO of the camera optical lens 10 is smaller than or equal to 2.47, so that a large aperture can be achieved and the camera optical lens can have good imaging performance. As an example, the F number FNO of the camera optical lens 10 is smaller than or equal to 2.42.

When the above-mentioned conditions are satisfied, the camera optical lens 10 has good optical performance, and when the free-form surface is adopted, the designed image plane area can be matched with an actual use area, thereby improving the image quality of the effective area to the greatest extent; and according to the characteristics of the camera optical lens 10, the camera optical lens 10 is especially suitable for a mobile phone camera lens assembly and a WEB camera lens composed of imaging elements such as CCD and CMOS for high pixels.

The camera optical lens 10 of the present invention will be described in the following by examples. The symbols described in each example are as follows. The focal length, the on-axis distance, the curvature radius, and the on-axis thickness are all expressed in unit of mm.

TTL: a total optical length (an on-axis distance from the object side surface of the first lens L1 to the image plane along an optic axis)), in unit of mm.

FNO: an F number (a ratio of an effective focal length of the camera optical lens to an entrance pupil diameter).

Table 1 and Table 2 show design data of the camera optical lens 10 according to Embodiment 1 of the present invention. Herein, the object side surface and the image side surface of the first lens L1 are free-form surfaces.

TABLE 1

|     | R       | d      |       | nd     |    | vd    |
|-----|---------|--------|-------|--------|----|-------|
| S1  | ∞       | d0=    | −0.449|        |    |       |
| R1  | 1.812   | d1=    | 0.940 | nd1 1.5444 | v1 | 55.82 |
| R2  | −11.978 | d2=    | 0.347 |        |    |       |
| R3  | −5.961  | d3=    | 0.228 | nd2 1.6610 | v2 | 20.53 |
| R4  | 3.134   | d4=    | 0.512 |        |    |       |
| R5  | 6.780   | d5=    | 0.495 | nd3 1.6610 | v3 | 20.53 |
| R6  | −14.251 | d6=    | 0.796 |        |    |       |
| R7  | 6.241   | d7=    | 0.390 | nd4 1.5444 | v4 | 55.82 |
| R8  | 3.929   | d8=    | 0.811 |        |    |       |
| R9  | −3.501  | d9=    | 0.676 | nd5 1.5444 | v5 | 55.82 |
| R10 | −14.828 | d10=   | 0.238 |        |    |       |
| R11 | ∞       | d11=   | 0.210 | ndg 1.5168 | vg | 64.17 |
| R12 | ∞       | d12=   | 0.204 |        |    |       |

Herein, the symbols in the table are defined as follows.
S1: aperture;
R: curvature radius at a center of an optical surface;
R1: central curvature radius of an object side surface of a first lens L1;
R2: central curvature radius of an image side surface of the first lens L1;
R3: central curvature radius of an object side surface of a second lens L2;
R4: central curvature radius of an image side surface of the second lens L2;
R5: central curvature radius of an object side surface of a third lens L3;
R6: central curvature radius of an image side surface of the third lens L3;
R7: central curvature radius of an object side surface of a fourth lens L4;
R8: central curvature radius of an image side surface of the fourth lens L4;
R9: central curvature radius of an object side surface of a fifth lens L5;
R10: central curvature radius of an image side surface of the fifth lens L5;
R11: central curvature radius of an object side surface of an optical filter GF;
R12: central curvature radius of an image side surface of the optical filter GF;
d: on-axis thickness of a lens, and on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the optical filter GF;
d11: on-axis thickness of the optical filter GF;
d12: on-axis distance from the image side surface of the optical filter GF to an image plane;
nd: refractive index of d-line;
nd1: refractive index of d-line of the first lens L1;
nd2: refractive index of d-line of the second lens L2;
nd3: refractive index of d-line of the third lens L3;
nd4: refractive index of d-line of the fourth lens L4;
nd5: refractive index of d-line of the fifth lens L5;
ndg: refractive index of d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF.

Table 2 shows aspherical data of each lens in the camera optical lens 10 according to Embodiment 1 of the present invention.

TABLE 2

|     | Cone coefficient | Aspherical coefficient | | | | |
|-----|---|---|---|---|---|---|
|     | k | A4 | A6 | A8 | A10 | A12 |
| R3  | 2.2971E+01 | 7.4889E−02 | 8.3466E−03 | −2.6210E−02 | −2.7472E−03 | 9.3154E−03 |
| R4  | 3.7727E+00 | 8.9448E−03 | 7.5289E−02 | −6.3892E−02 | −5.4441E−03 | 2.2173E−02 |
| R5  | −1.1699E+02 | −3.6302E−02 | 2.7441E−02 | 7.3616E−03 | 3.6480E−03 | −5.4272E−03 |
| R6  | 7.3995E+01 | −8.1661E−02 | 5.4372E−02 | −1.3759E−02 | 3.8904E−03 | 2.5698E−03 |
| R7  | 1.5179E+01 | −1.7792E−01 | 2.1711E−02 | 6.8832E−03 | −5.7811E−03 | 3.7755E−03 |
| R8  | 2.5327E+00 | −1.2245E−01 | 2.5855E−02 | 1.9612E−03 | −6.8219E−04 | −6.1874E−04 |
| R9  | 6.1528E−01 | −8.1787E−03 | 8.1785E−03 | −1.4423E−03 | −1.5727E−04 | 7.2592E−05 |
| R10 | −5.8465E+02 | −5.3523E−02 | 1.3516E−02 | −2.4647E−03 | 1.0053E−04 | 7.0377E−06 |

|     | Cone coefficient | Aspherical coefficient | | | |
|-----|---|---|---|---|---|
|     | k | A14 | A16 | A18 | A20 |
| R3  | 2.2971E+01 | 1.7620E−03 | 2.6234E−04 | −9.0213E−04 | −1.9622E−04 |
| R4  | 3.7727E+00 | 6.6719E−03 | −5.1501E−03 | −1.3555E−03 | −5.2343E−04 |

TABLE 2-continued

| | | | | | |
|---|---|---|---|---|---|
| R5 | −1.1699E+02 | −2.1835E−03 | 2.0194E−03 | 9.6355E−04 | −7.4056E−04 |
| R6 | 7.3995E+01 | −2.5292E−03 | 8.4057E−04 | −2.9835E−04 | −1.3312E−05 |
| R7 | 1.5179E+01 | −1.8957E−03 | 2.7771E−04 | −6.3429E−05 | −2.3792E−05 |
| R8 | 2.5327E+00 | 2.3816E−04 | −5.5516E−05 | 2.1086E−05 | −4.0987E−06 |
| R9 | 6.1528E−01 | 2.1624E−05 | −3.9751E−06 | 4.5442E−07 | −1.6764E−07 |
| R10 | −5.8465E+02 | −2.2169E−06 | 7.1075E−07 | −4.9322E−09 | −9.9593E−10 |

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (1)$$

Herein, k represents a cone coefficient, A4, A6, A8, A10, A12, A14, A16, A18, and A20 represent aspherical coefficients, c represents a curvature at a center of an optical surface, r represents a vertical distance between a point on an aspherical curve and an optic axis, Z represents an aspherical depth (a vertical distance between a point on the aspherical surface that is distanced from the optic axis by r and a surface tangent to a vertex of the aspherical surface on the optic axis).

For convenience, the aspherical surface of each lens adopts the aspherical surface shown in the above equation (1). However, the present invention is not limited to the aspherical surface defined by the polynomial form expressed by the equation (1).

Table 3 shows free-form surface data in the camera optical lens 10 according to Embodiment 1 of the present invention.

aspherical surface that is distanced from the optic axis by r and a surface tangent to a vertex of the aspherical surface on the optic axis).

For convenience, each free-form surface adopts the surface type defined by the extended polynomial shown in the above equation (2). However, the present invention is not limited to the free-form surface defined by the polynomial form expressed by the equation (2).

Figure 2:
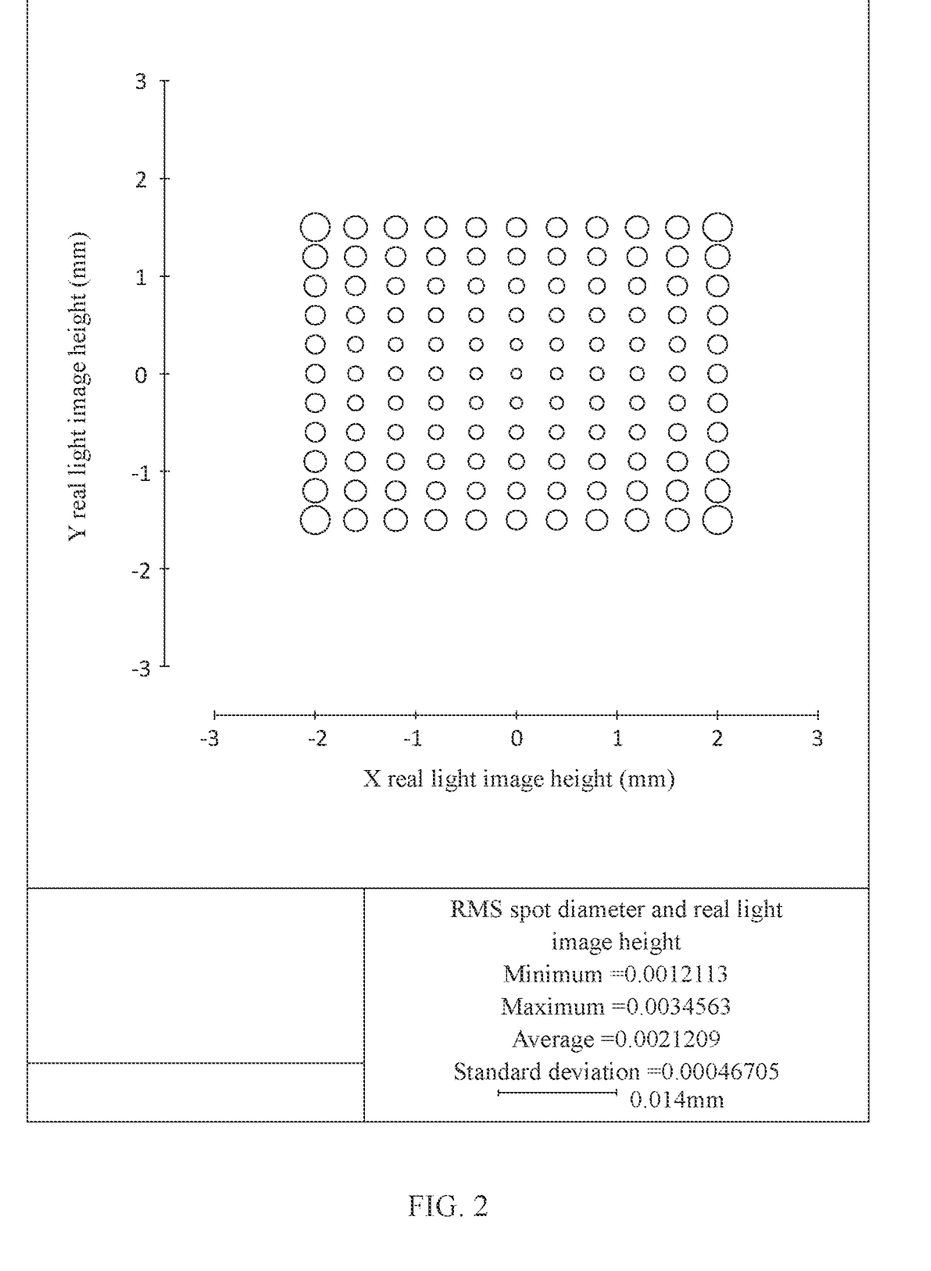
FIG. 2 illustrates a situation where an RMS spot diameter of the camera optical lens shown in FIG. 1 is within a first quadrant.

FIG. 2 illustrates a situation where an RMS spot diameter of the camera optical lens 10 according to Embodiment 1 is within a first quadrant. According to FIG. 2, it can be seen that the camera optical lens 10 according to Embodiment 1 can achieve good imaging quality.

The value corresponding to the various parameters and the parameters specified in the conditions for each of Embodiments 1, 2, 3 and 4 are listed in Table 13.

As shown in Table 13, Embodiment 1 satisfies the respective conditions.

TABLE 3

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | 1.1757E−02 | −1.5426E−03 | −3.0593E−03 | −1.3905E−03 | 3.0982E−03 | 9.3929E−03 | 9.2821E−03 | 3.1890E−03 |
| R2 | 8.6300E+01 | 3.6251E−02 | 7.2511E−02 | 3.6615E−02 | −6.9656E−03 | −2.0852E−02 | −2.1040E−02 | −6.9981E−03 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R1 | 4.6673E−02 | 2.3560E−02 | 4.6729E−03 | −1.2772E−03 | −7.6964E−03 | −1.9161E−02 | −2.5626E−02 | −1.9317E−02 |
| R2 | −3.1884E−02 | −1.6101E−02 | −3.1941E−03 | −1.9369E−03 | −1.1335E−02 | −2.9146E−02 | −3.7779E−02 | −2.8583E−02 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R1 | −3.5659E−03 | −4.9955E−04 | 2.4772E−04 | 1.8849E−03 | 6.7879E−03 | 1.3309E−02 | 1.7029E−02 | 1.3540E−02 |
| R2 | −6.1516E−03 | −9.6428E−04 | 1.4819E−03 | 1.2105E−02 | 4.0155E−02 | 8.1867E−02 | 1.0257E−01 | 8.2962E−02 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R1 | 9.7284E−03 | 6.5525E−03 | 2.6112E−03 | 6.4595E−04 | 7.7945E−05 | −4.2896E−05 | −3.6956E−04 | −1.8082E−03 |
| R2 | 1.1295E−01 | 7.3826E−02 | 3.0019E−02 | 8.1409E−03 | 8.6477E−04 | −6.0744E−04 | −6.3747E−03 | −2.6107E−02 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R1 | −4.7618E−03 | −1.8876E−02 | −2.8828E−02 | −1.8760E−02 | −4.7480E−03 | 4.6789E−03 | 2.3496E−02 | 4.6757E−02 |
| R2 | 9.5221E−03 | 3.8088E−02 | 5.7464E−02 | 3.7897E−02 | 9.5459E−03 | −3.2339E−03 | −1.6077E−02 | −3.2747E−02 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R1 | −7.6970E−03 | −1.2868E−03 | −4.9146E−04 | −3.5560E−03 | −1.0409E−02 | −1.7417E−02 | −1.7562E−02 | −1.0584E−02 |
| R2 | −1.1420E−02 | −1.9247E−03 | −9.3830E−04 | −6.3404E−03 | −2.0662E−02 | −3.2963E−02 | −3.1674E−02 | −2.0710E−02 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R1 | 6.7040E−03 | 1.8230E−03 | 2.4295E−04 | 7.4138E−05 | 6.6724E−04 | 2.8959E−03 | 6.3306E−03 | 9.8432E−03 |
| R2 | 3.8522E−02 | 1.2212E−02 | 1.4325E−03 | 8.9589E−04 | 8.0630E−03 | 3.1221E−02 | 7.4271E−02 | 1.1001E−01 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R1 | −5.4398E−03 | −7.9922E−03 | −1.1034E−02 | −7.7592E−03 | −5.1393E−03 | −1.5140E−03 | −3.4380E−04 | −4.1792E−05 |
| R2 | −6.9622E−02 | −1.2875E−01 | −1.4429E−01 | −1.3078E−01 | −7.0098E−02 | −2.4270E−02 | −6.5647E−03 | −5.6581E−04 |

$$Z = \frac{cr^2}{1+\sqrt{1-(1+k)c^2r^2}} + \sum_{i=1}^{N} B_i E_i(x, y) \quad (2)$$

Herein in the equation (2), k represents a cone coefficient, Bi represents an aspherical coefficient, c represents a curvature at the center of an optical surface, r represents a vertical distance between the a point on a free-form surface and an optic axis, x represents an x-direction component of r, y represents a y-direction component of r, z represents an aspherical depth (a vertical distance between a point on the In this embodiment, an entrance pupil diameter ENPD of the camera optical lens is 2.457 mm, the full field of view image height IH (in a diagonal direction) is 5.000 mm, the image height in an x direction is 4.000 mm, the image height in a y direction is 3.000 mm, and the imaging effect is the best in this rectangular area; the field of view (FOV) in a diagonal direction is 45.16°, the FOV in the x direction is 36.98°, and the FOV in the y direction is 28.33°. The camera optical lens 10 satisfies the design requirements of a long focal length and ultra-thinness, and its on-axis and off-axis color aberrations are sufficiently corrected, and the camera optical lens has excellent optical characteristics.

Embodiment 2

Embodiment 2 is basically the same as Embodiment 1, the symbols in Embodiment 2 are defined the same as those in Embodiment 1, and only the difference from Embodiment 1 will be described in the following.

Figure 3:
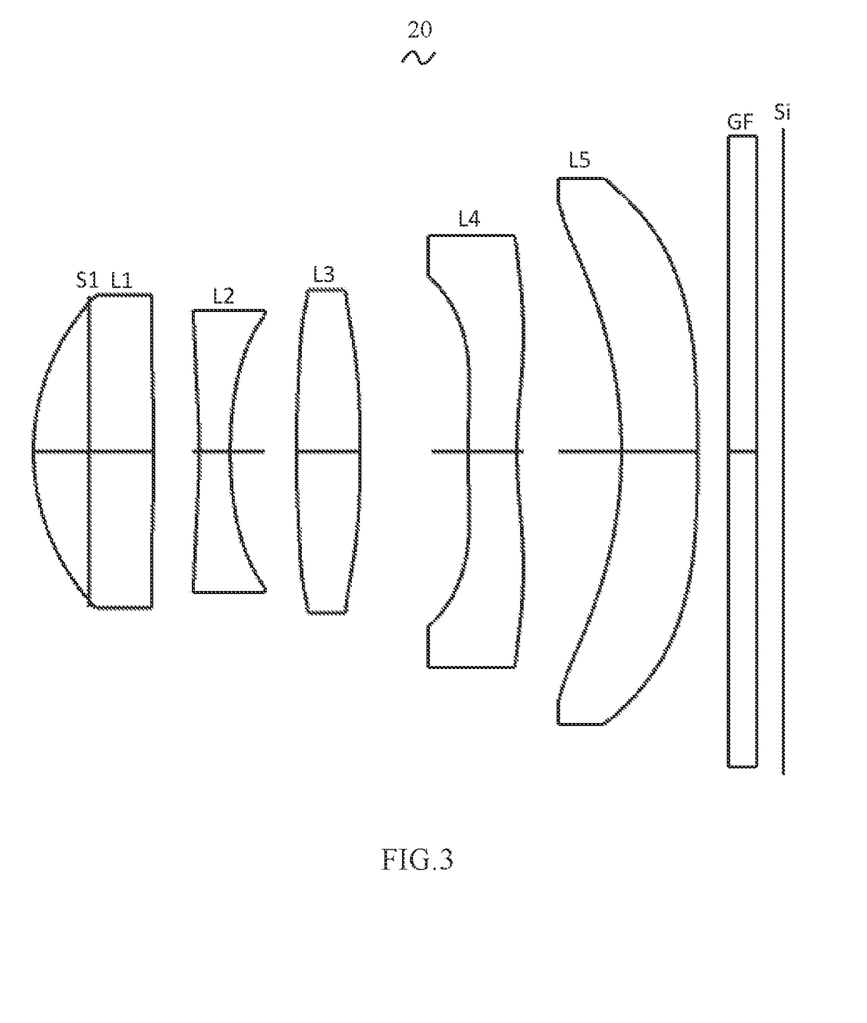
FIG. 3 is a schematic structural diagram of a camera optical lens according to Embodiment 2 of the present invention.

Table 4 and Table 5 show design data of the camera optical lens 20 according to Embodiment 2 of the present invention. Herein, the object side surface and the image side surface of the fourth lens L4 are free-form surfaces.

TABLE 4

|  | R | d | nd | vd |
|---|---|---|---|---|
| S1 | ∞ | d0= −0.423 | | |
| R1 | 1.794 | d1= 0.912 | nd1 1.5444 | v1 55.82 |
| R2 | −11.805 | d2= 0.346 | | |
| R3 | −5.905 | d3= 0.235 | nd2 1.6610 | v2 20.53 |
| R4 | 3.143 | d4= 0.501 | | |
| R5 | 6.671 | d5= 0.485 | nd3 1.6610 | v3 20.53 |
| R6 | −13.562 | d6= 0.819 | | |
| R7 | 6.078 | d7= 0.370 | nd4 1.5444 | v4 55.82 |
| R8 | 3.699 | d8= 0.794 | | |
| R9 | −3.590 | d9= 0.577 | nd5 1.5444 | v5 55.82 |
| R10 | −18.206 | d10= 0.236 | | |
| R11 | ∞ | d11= 0.210 | ndg 1.5168 | vg 64.17 |
| R12 | ∞ | d12= 0.204 | | |

Table 5 shows aspherical data of the respective lenses in the camera optical lens 20 according to Embodiment 2 of the present invention.

TABLE 5

| | Cone coefficient | Aspherical coefficient | | | | |
|---|---|---|---|---|---|---|
| | k | A4 | A6 | A8 | A10 | A12 |
| R1 | 1.1158E−02 | −1.6266E−03 | 2.7878E−03 | −4.7582E−03 | 4.9463E−03 | −1.3136E−03 |
| R2 | 8.7201E+01 | 3.6569E−02 | −6.8508E−03 | 9.4211E−03 | −3.3451E−03 | −1.9381E−03 |
| R3 | 2.3090E+01 | 7.5790E−02 | 8.3125E−03 | −2.5941E−03 | −2.8975E−03 | 1.0370E−02 |
| R4 | 3.8669E+00 | 8.1981E−03 | 7.5612E−02 | −6.3518E−02 | −4.8011E−03 | 2.2987E−02 |
| R5 | −1.1491E+02 | −3.8500E−02 | 2.7078E−02 | 7.6933E−03 | 3.7703E−03 | −5.3119E−03 |
| R6 | 7.7782E+01 | −8.1537E−02 | 5.4943E−02 | −1.4212E−02 | 3.6900E−03 | 2.7167E−03 |
| R9 | 6.5110E−01 | −6.5786E−03 | 7.6819E−03 | −1.5490E−03 | −1.7804E−04 | 6.8629E−05 |
| R10 | −7.8663E+02 | −5.4007E−02 | 1.3401E−02 | −2.6503E−03 | 1.2281E−04 | 8.2461E−06 |

| | Cone coefficient | Aspherical coefficient | | | | |
|---|---|---|---|---|---|---|
| | k | A14 | A16 | A18 | A20 | |
| R1 | 1.1158E−02 | −7.4725E−04 | 2.6391E−04 | 2.0610E−04 | −9.2752E−05 | |
| R2 | 8.7201E+01 | −8.4638E−04 | 1.5731E−03 | 9.2705E−04 | −6.5300E−04 | |
| R3 | 2.3090E+01 | 2.4834E−03 | −1.4538E−03 | 4.8643E−04 | −7.5337E−04 | |
| R4 | 3.8669E+00 | 7.1899E−03 | −5.0743E−03 | −1.6547E−03 | −9.9430E−04 | |
| R5 | −1.1491E+02 | −2.0512E−03 | 2.1779E−03 | 1.0432E−03 | −8.7590E−04 | |
| R6 | 7.7782E+01 | −2.2876E−03 | 9.8737E−04 | −2.7955E−04 | −9.1060E−05 | |
| R9 | 6.5110E−01 | 2.1369E−05 | −3.8152E−06 | 5.1014E−07 | −1.5489E−07 | |
| R10 | −7.8663E+02 | −2.7661E−06 | 6.1371E−07 | −6.6791E−10 | 2.7121E−09 | |

Table 6 shows the free-form surface data in the camera optical lens 20 according to Embodiment 2 of the present invention.

TABLE 6

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R7 | 1.4934E+01 | −1.8130E−01 | −3.6627E−01 | −1.8158E−01 | 1.9849E−02 | 6.0904E−02 | 6.3908E−02 | 1.9974E−02 |
| R8 | 2.3609E+00 | −1.2323E−01 | −2.5073E−01 | −1.2315E−01 | 2.4082E−02 | 7.6214E−02 | 7.8543E−02 | 2.4372E−02 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R7 | −5.3580E−02 | −2.8150E−02 | −6.4957E−03 | 3.8878E−03 | 2.3220E−02 | 5.6329E−02 | 7.5809E−02 | 5.7453E−02 |
| R8 | −7.7112E−03 | −3.2788E−03 | −5.1469E−04 | −8.2674E−04 | −3.3896E−03 | −1.0128E−02 | −1.2586E−02 | −9.7481E−03 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R7 | −1.3131E−02 | −9.0713E−04 | 2.3129E−04 | 1.4357E−03 | 8.2711E−03 | 1.7064E−02 | 1.7743E−02 | 1.2338E−02 |
| R8 | 1.6477E−03 | 1.4466E−04 | −7.8961E−05 | −6.0152E−04 | −1.6054E−03 | −3.0457E−03 | −3.8658E−03 | −3.1588E−03 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R7 | −5.5466E−04 | −5.4516E−03 | −1.1642E−02 | 4.6506E−03 | −3.3928E−04 | −8.7421E−06 | 2.4274E−05 | −7.6733E−04 |
| R8 | 2.7717E−03 | 1.8396E−03 | 7.5764E−04 | 1.0843E−04 | 3.0287E−05 | −4.7414E−06 | −4.2736E−05 | −5.6187E−05 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R7 | 6.3145E−03 | 2.4653E−02 | 3.7989E−02 | 2.6314E−02 | 6.7645E−03 | −5.5438E−03 | −2.6806E−02 | −6.1581E−02 |
| R8 | 3.0552E−03 | 8.0226E−03 | 1.0468E−02 | 8.6237E−03 | 2.0121E−03 | −1.0458E−03 | −4.0573E−03 | −5.4287E−03 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R7 | 2.3253E−02 | 3.9175E−03 | −1.9024E−03 | −1.3691E−02 | −3.8745E−02 | −6.5398E−02 | −6.7245E−02 | −4.3262E−02 |
| R8 | −3.8079E−03 | −4.7022E−04 | 3.9506E−04 | 1.8133E−03 | 4.8710E−03 | 7.7238E−03 | 8.1654E−03 | 4.7759E−03 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |

TABLE 6-continued

| | | | Free-form surface coefficient | | | | | |
|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R7 | 4.6157E−03 | 3.3641E−03 | −2.1211E−04 | −8.3503E−05 | −8.6117E−04 | −2.2571E−03 | −5.2951E−03 | −6.6903E−03 |
| R8 | −1.5625E−03 | −4.5895E−04 | −4.1099E−05 | 2.1566E−05 | 2.0360E−04 | 5.9200E−04 | 2.2067E−03 | 2.6691E−03 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R7 | −5.3817E−03 | −6.4009E−03 | −1.7066E−02 | −1.1177E−03 | 2.8616E−03 | 4.7533E−03 | −5.2575E−03 | 1.8388E−04 |
| R8 | −6.0296E−04 | −8.4240E−04 | −1.0331E−03 | −7.4816E−04 | −3.7714E−04 | −1.2013E−04 | −8.5182E−05 | −8.7512E−06 |

Figure 4:
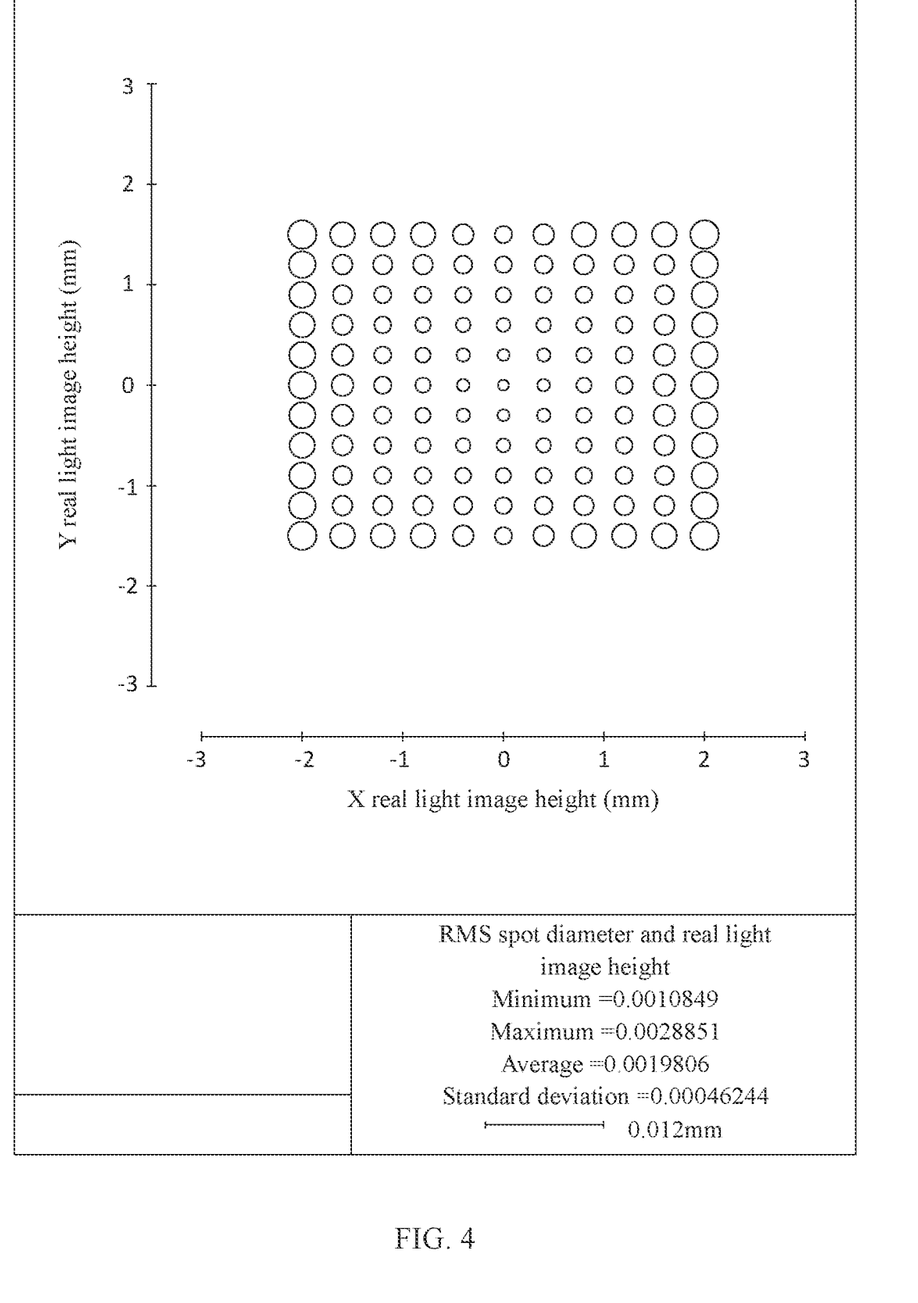
FIG. 4 illustrates a situation where an RMS spot diameter of the camera optical lens shown in FIG. 3 is within a first quadrant.

FIG. 4 illustrates a situation where an RMS spot diameter of the camera optical lens 20 according to Embodiment 2 is within a first quadrant. According to FIG. 4, it can be seen that the camera optical lens 20 according to Embodiment 2 can achieve good imaging quality.

As shown in Table 13, Embodiment 2 satisfies the respective conditions.

In this embodiment, an entrance pupil diameter ENPD of the camera optical lens is 2.391 mm, the full field of view image height IH (in a diagonal direction) is 5.000 mm, the image height in an x direction is 4.000 mm, the image height in a y direction is 3.000 mm, and the imaging effect is the best in this rectangular area; the FOV in a diagonal direction is 45.90°, the FOV in the x direction is 37.75°, and the FOV in the y direction is 28.99°. The camera optical lens 20 satisfies the design requirements of a long focal length and ultra-thinness, its on-axis and off-axis color aberrations are sufficiently corrected, and the camera optical lens has excellent optical characteristics.

Embodiment 3

Embodiment 3 is basically the same as Embodiment 1, the symbols in Embodiment 3 are defined the same as those in Embodiment 1, and only the difference from Embodiment 1 will be described in the following.

Figure 5:
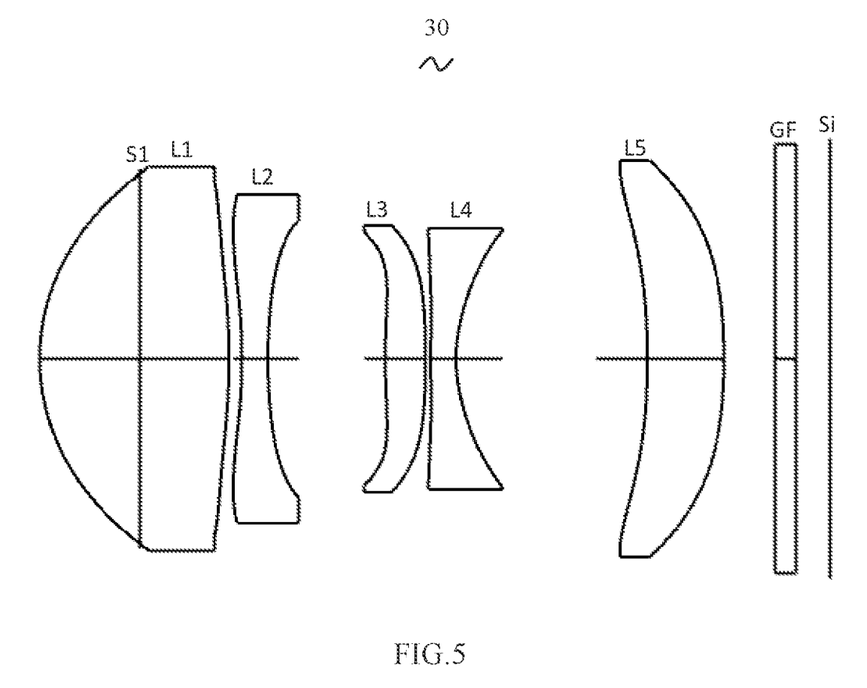
FIG. 5 is a schematic structural diagram of a camera optical lens according to Embodiment 2 of the present invention.

In this embodiment, the fifth lens L5 has a positive refractive power.

Table 7 and Table 8 show design data of the camera optical lens 30 according to Embodiment 3 of the present invention. Herein, the object side surface and the image side surface of the fifth lens L5 are free-form surfaces.

TABLE 7

| | R | d | | nd | | vd |
|---|---|---|---|---|---|---|
| S1 | ∞ | d0= | −0.989 | | | |
| R1 | 2.291 | d1= | 1.870 | nd1 | 1.5438 | v1 | 56.03 |
| R2 | −8.720 | d2= | 0.126 | | | |
| R3 | −8.067 | d3= | 0.256 | nd2 | 1.6610 | v2 | 20.53 |
| R4 | 5.315 | d4= | 1.159 | | | |
| R5 | 7.642 | d5= | 0.400 | nd3 | 1.6610 | v3 | 20.53 |
| R6 | −15.002 | d6= | 0.050 | | | |
| R7 | 6.218 | d7= | 0.250 | nd4 | 1.5438 | v4 | 56.03 |
| R8 | 1.592 | d8= | 1.891 | | | |
| R9 | −8.842 | d9= | 0.757 | nd5 | 1.5346 | v5 | 55.69 |
| R10 | −6.575 | d10= | 0.500 | | | |
| R11 | ∞ | d11= | 0.210 | ndg | 1.5168 | vg | 64.17 |
| R12 | ∞ | d12= | 0.340 | | | |

Table 8 shows aspherical data of the respective lenses in the camera optical lens 30 according to Embodiment 3 of the present invention.

TABLE 8

| | Cone coefficient | Aspherical coefficient | | | | |
|---|---|---|---|---|---|---|
| | k | A4 | A6 | A8 | A10 | A12 |
| R1 | −9.3185E−02 | −4.9177E−04 | 6.0744E−04 | −9.8858E−04 | 7.9812E−04 | −3.6047E−04 |
| R2 | 1.3023E+01 | −4.2593E−02 | 9.7660E−02 | −8.6024E−02 | 4.4776E−02 | −1.3933E−02 |
| R3 | −9.9470E+00 | −1.0046E−01 | 2.2718E−01 | −2.3911E−01 | 1.5623E−01 | −6.4189E−02 |
| R4 | 8.3158E+00 | −6.7665E−02 | 1.4737E−01 | −1.6339E−01 | 1.1394E−01 | −4.7817E−02 |
| R5 | −3.2607E+01 | −3.1778E−02 | −4.4436E−02 | 3.2299E−02 | −6.8713E−02 | 6.1191E−02 |
| R6 | −1.0000E+01 | −1.2243E−01 | 2.1114E−01 | −3.2690E−01 | 2.6568E−01 | −1.2290E−01 |
| R7 | −7.7679E+00 | −3.3947E−01 | 6.4666E−01 | −7.8372E−01 | 6.2661E−01 | −3.1368E−01 |
| R8 | −7.2551E+00 | −4.0921E−02 | 1.9048E−01 | −2.2692E−01 | 1.7399E−01 | −8.7307E−02 |

| | Cone coefficient | Aspherical coefficient | | | |
|---|---|---|---|---|---|
| | k | A14 | A16 | A18 | A20 |
| R1 | −9.3185E−02 | 8.2566E−05 | −8.0191E−06 | 0.0000E+00 | 0.0000E+00 |
| R2 | 1.3023E+01 | 2.3721E−03 | −1.6957E−04 | 0.0000E+00 | 0.0000E+00 |
| R3 | −9.9470E+00 | 1.5963E−02 | −2.1581E−03 | 1.1909E−04 | 0.0000E+00 |
| R4 | 8.3158E+00 | 1.1058E−02 | −1.0110E−03 | 0.0000E+00 | 0.0000E+00 |
| R5 | −3.2607E+01 | −2.5217E−02 | 4.1803E−03 | 0.0000E+00 | 0.0000E+00 |
| R6 | −1.0000E+01 | 3.0211E−02 | −2.9685E−03 | 0.0000E+00 | 0.0000E+00 |
| R7 | −7.7679E+00 | 8.7993E−02 | −1.0673E−02 | 7.1712E−05 | 0.0000E+00 |
| R8 | −7.2551E+00 | 2.5198E−02 | −3.1108E−03 | 0.0000E+00 | 0.0000E+00 |

Table 9 shows free-form surface data in the camera optical lens 30 according to Embodiment 3 of the present invention.

TABLE 9

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R9 | −9.5419E+00 | −2.5149E−02 | −4.8907E−02 | −2.3643E−02 | 1.0223E−02 | 2.9893E−02 | 3.0176E−02 | 1.0029E−02 |
| R10 | −6.0297E+00 | −3.9150E−02 | −7.7832E−02 | −3.6783E−02 | 8.2356E−03 | 2.6716E−02 | 2.6191E−02 | 8.1182E−03 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R9 | −5.7862E−03 | −2.9139E−03 | −4.7895E−04 | 8.9315E−04 | 5.3588E−03 | 1.3358E−02 | 1.7958E−02 | 1.3402E−02 |
| R10 | −6.6015E−03 | −3.3016E−02 | −6.5200E−03 | 4.3190E−03 | 2.5991E−02 | 6.5128E−02 | 8.6692E−02 | 6.5110E−02 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R9 | −2.3033E−03 | −3.3340E−04 | 5.5744E−05 | 4.4195E−04 | 1.5348E−03 | 3.0716E−03 | 3.8259E−03 | 3.0681E−03 |
| R10 | −1.0904E−02 | −1.5546E−03 | 3.3114E−04 | 2.6426E−03 | 9.2376E−03 | 1.8470E−02 | 2.3117E−02 | 1.8453E−02 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R9 | −4.2246E−04 | −2.8637E−04 | −1.1271E−04 | −4.1293E−05 | −1.4258E−06 | 0.0000E+00 | 0.0000E+00 | 0.0000E+00 |
| R10 | −4.9209E−03 | −3.2902E−03 | −1.4061E−03 | −3.5017E−04 | −4.0274E−05 | 1.9448E−06 | 1.9890E−05 | 9.0402E−05 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R9 | −2.4612E−03 | −9.4513E−03 | −1.4531E−02 | −9.3587E−03 | −2.6804E−03 | −5.8145E−04 | −2.9800E−03 | −5.7238E−03 |
| R10 | 3.0927E−03 | 1.0764E−02 | 1.6245E−02 | 1.1304E−02 | 2.6070E−03 | −6.6497E−03 | −3.2984E−02 | −6.6147E−02 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R9 | 5.3953E−03 | 9.8607E−04 | −3.3426E−04 | −2.3410E−03 | −7.0663E−03 | −1.1767E−02 | −1.1756E−02 | −7.0001E−03 |
| R10 | 2.6014E−02 | 4.3641E−03 | −1.5577E−03 | −1.0905E−02 | −3.2728E−02 | −5.4505E−02 | −5.4540E−02 | −3.2685E−02 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R9 | 1.5707E−03 | 4.4090E−04 | 3.5407E−05 | −3.5358E−06 | −3.0430E−05 | −1.2040E−04 | −2.7517E−04 | −4.1304E−04 |
| R10 | 9.2469E−03 | 2.6423E−03 | 3.3050E−04 | −3.8841E−05 | −3.5102E−05 | −1.4049E−03 | −3.2828E−03 | −4.9198E−03 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R9 | 0.0000E+00 | 0.0000E+00 | 0.0000E+00 | 0.0000E+00 | 0.0000E+00 | 0.0000E+00 | 0.0000E+00 | 0.0000E+00 |
| R10 | 2.4088E−04 | 4.2166E−04 | 5.0289E−04 | 4.2810E−04 | 2.4703E−04 | 9.2359E−05 | 1.7305E−05 | 2.0076E−06 |

Figure 6:
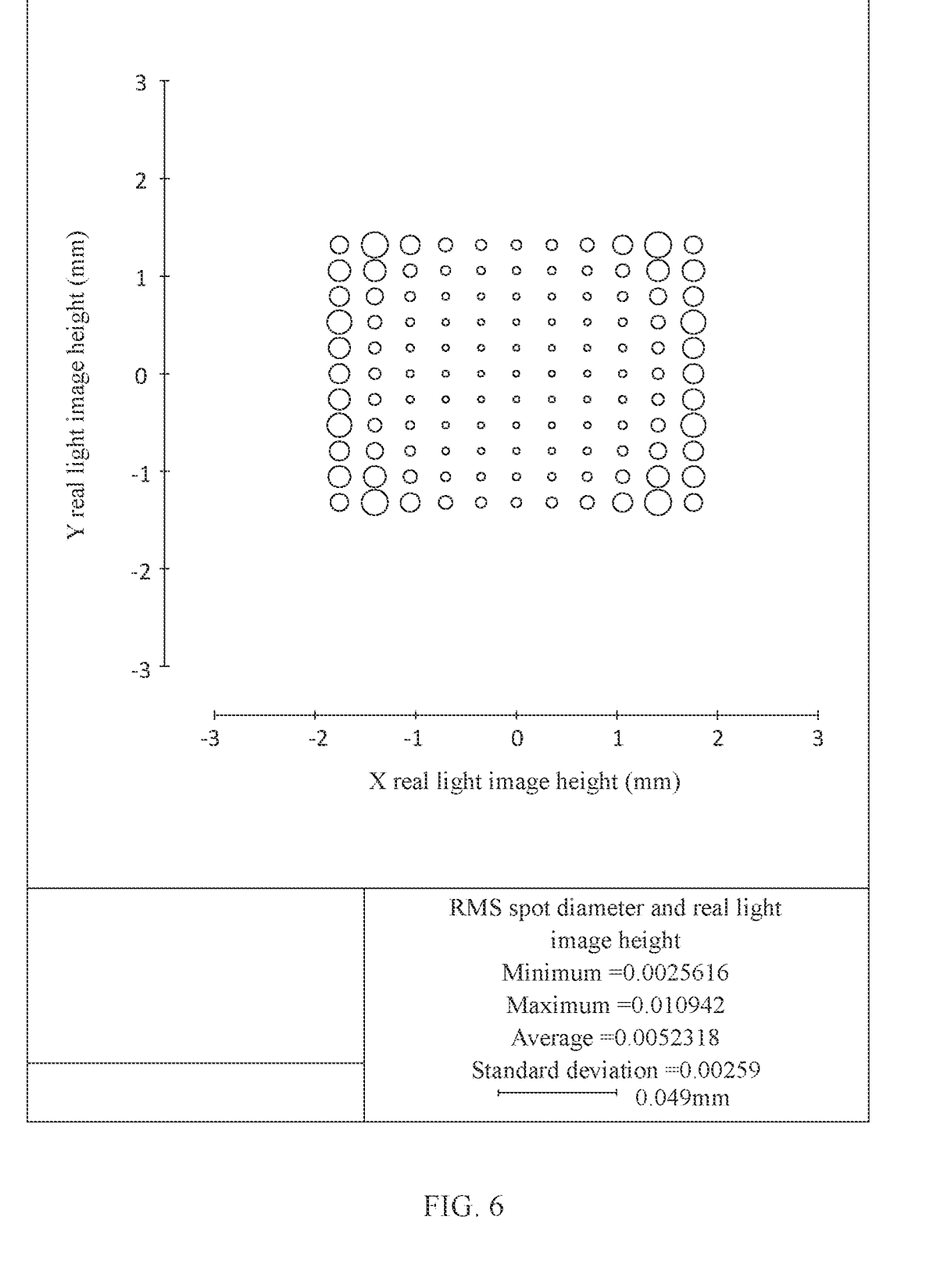
FIG. 6 illustrates a situation where an RMS spot diameter of the camera optical lens shown in FIG. 1 is within a first quadrant.

FIG. 6 illustrates a situation where an RMS spot diameter of the camera optical lens 30 according to Embodiment 3 is within a first quadrant. According to FIG. 6, it can be seen that the camera optical lens 30 according to Embodiment 3 can achieve good imaging quality.

Value corresponding to the various parameters and the parameters specified in the conditions for this embodiment are listed in Table 13. It can be seen that the imaging optical system according to this embodiment satisfies the above-mentioned conditions.

In this embodiment, an entrance pupil diameter ENPD of the camera optical lens is 3.969 mm, the full field of view image height IH (in a diagonal direction) is 4.400 mm, the image height in an x direction is 3.520 mm, the image height in a y direction is 2.640 mm, and the imaging effect is the best in this rectangular area; the FOV in a diagonal direction is 27.43°, the FOV in the x direction is 22.18°, and the FOV in the y direction is 16.82°. The camera optical lens 30 satisfies the design requirements of a long focal length angle and ultra-thinness, its on-axis and off-axis color aberrations are sufficiently corrected, and the camera optical lens has excellent optical characteristics.

Embodiment 4

Embodiment 4 is basically the same as Embodiment 1, the symbols in Embodiment 4 are defined the same as those in Embodiment 1, and only the difference from Embodiment 1 will be described in the following.

Figure 7:
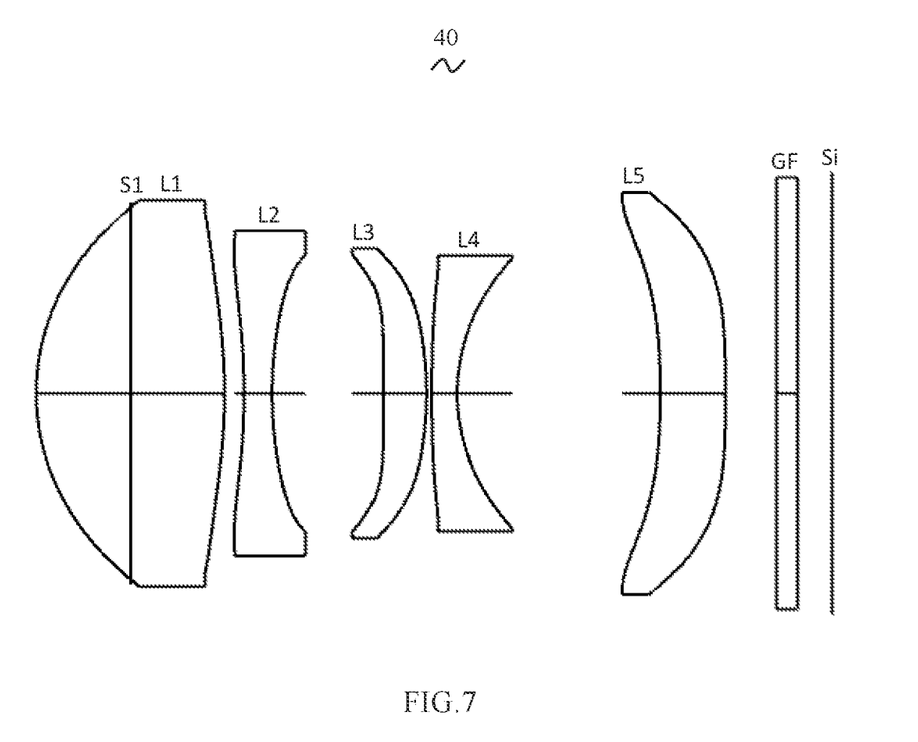
FIG. 7 is a schematic structural diagram of a camera optical lens according to Embodiment 4 of the present invention.

In this embodiment, an object side surface of the third lens L3 is a concave surface at a paraxial position.

Table 10 and Table 11 show design data of the camera optical lens 40 according to Embodiment 4 of the present invention.

TABLE 10

| | R | d | | nd | | vd | |
|---|---|---|---|---|---|---|---|
| S1 | ∞ | d0= | −0.921 | | | | |
| R1 | 2.399 | d1= | 1.846 | nd1 | 1.5438 | v1 | 56.03 |
| R2 | −6.571 | d2= | 0.191 | | | | |
| R3 | −10.067 | d3= | 0.277 | nd2 | 1.6610 | v2 | 20.53 |
| R4 | 4.048 | d4= | 1.091 | | | | |
| R5 | −124.805 | d5= | 0.424 | nd3 | 1.6610 | v3 | 20.53 |
| R6 | −3.070 | d6= | 0.050 | | | | |
| R7 | 58.824 | d7= | 0.250 | nd4 | 1.5438 | v4 | 56.03 |
| R8 | 1.849 | d8= | 1.992 | | | | |
| R9 | −9.643 | d9= | 0.640 | nd5 | 1.5346 | v5 | 55.69 |
| R10 | −43.478 | d10= | 0.500 | | | | |
| R11 | ∞ | d11= | 0.210 | ndg | 1.5168 | vg | 64.17 |
| R12 | ∞ | d12= | 0.340 | | | | |

Table 11 shows aspherical data of the respective lenses in the camera optical lens 40 according to Embodiment 4 of the present invention.

TABLE 11

| | Cone coefficient | Aspherical coefficient | | | | |
|---|---|---|---|---|---|---|
| | k | A4 | A6 | A8 | A10 | A12 |
| R3 | 1.0000E+01 | −5.4364E−02 | 8.1251E−02 | −5.3330E−02 | 1.5966E−02 | 2.9352E−03 |
| R4 | 4.6335E+00 | −5.7562E−02 | 6.8290E−02 | −4.6228E−02 | 1.2551E−02 | 6.8022E−03 |
| R5 | 1.0000E+01 | −1.3655E−02 | −9.8791E−03 | −1.1459E−01 | 1.6240E−01 | −1.0551E−01 |
| R6 | −8.8377E+00 | 1.6620E−01 | −4.5501E−01 | 5.1840E−01 | −3.5898E−01 | 1.4815E−01 |
| R7 | 1.0000E+01 | 1.6019E−01 | −4.5249E−01 | 6.6565E−01 | −5.3832E−01 | 2.4361E−01 |
| R8 | −9.1920E+00 | 7.7133E−02 | −4.4370E−02 | 9.3970E−02 | −9.8633E−02 | 5.3146E−02 |

TABLE 11-continued

| | | | | | |
|---|---|---|---|---|---|
| R9 | 2.4349E+00 | −4.0987E−02 | 2.2379E−02 | −1.6728E−02 | 1.0509E−02 | −4.1356E−03 |
| R10 | 7.3235E+00 | −5.9969E−02 | 2.0176E−02 | −1.1322E−02 | 4.2685E−03 | −7.1834E−04 |

| | Cone coefficient | Aspherical coefficient | | | |
|---|---|---|---|---|---|
| | k | A14 | A16 | A18 | A20 |
| R3 | 1.0000E+01 | −4.0168E−03 | 1.2242E−03 | −1.3063E−04 | 0.0000E+00 |
| R4 | 4.6335E+00 | −5.8547E−03 | 1.2685E−03 | 0.0000E+00 | 0.0000E+00 |
| R5 | 1.0000E+01 | 3.3180E−02 | −3.8994E−03 | 0.0000E+00 | 0.0000E+00 |
| R6 | −8.8377E+00 | −3.3946E−02 | 3.4010E−03 | 0.0000E+00 | 0.0000E+00 |
| R7 | 1.0000E+01 | −5.7274E−02 | 4.9156E−03 | 1.5600E−04 | 0.0000E+00 |
| R8 | −9.1920E+00 | −1.4877E−02 | 1.6897E−03 | 0.0000E+00 | 0.0000E+00 |
| R9 | 2.4349E+00 | 9.5532E−04 | −1.1680E−04 | 5.8568E−06 | 0.0000E+00 |
| R10 | 7.3235E+00 | −1.0564E−04 | 7.4160E−05 | −1.3631E−05 | 9.3096E−07 |

Table 12 shows free-form surface data in the camera optical lens 40 according to Embodiment 4 of the present invention.

TABLE 12

| | Free-form surface coefficient | | | | | | |
|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −9.0691E−02 | 7.2872E−05 | 2.0010E−04 | 7.4907E−05 | −2.7155E−04 | −8.8395E−04 | −8.8442E−04 | −2.4962E−04 |
| R2 | 9.0625E+00 | −8.2346E−05 | −1.7225E−04 | −4.6429E−05 | 1.9843E−02 | 5.9973E−02 | 5.9633E−02 | 1.9893E−02 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R1 | 4.5857E−03 | 2.2970E−03 | 4.6231E−04 | −2.7339E−04 | −1.6563E−03 | −4.1360E−03 | −5.5329E−03 | −4.1562E−03 |
| R2 | 7.5176E−02 | 3.7451E−02 | 7.5289E−03 | −2.5100E−03 | −1.4930E−02 | −3.7382E−02 | −4.9857E−02 | −3.7335E−02 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R1 | 4.7488E−04 | 6.8361E−05 | −6.3627E−06 | −5.1810E−05 | −1.8014E−04 | −3.6394E−04 | −4.5417E−04 | −3.6305E−04 |
| R2 | 3.3924E−03 | 4.7720E−04 | −4.0112E−05 | −3.1308E−04 | −1.0992E−03 | −2.1873E−03 | −2.7373E−03 | −2.2070E−03 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R1 | −2.4130E−04 | −9.0357E−04 | −1.3286E−03 | −9.1470E−04 | −2.5072E−04 | 4.5948E−04 | 2.2916E−03 | 4.5714E−03 |
| R2 | −1.4885E−02 | −5.9954E−02 | −8.9873E−02 | −5.9473E−02 | −1.4948E−02 | 7.5189E−03 | 3.7617E−02 | 7.5361E−02 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R1 | −1.6483E−03 | −2.7533E−04 | 6.7541E−05 | 4.8007E−04 | 1.4352E−03 | 2.4112E−03 | 2.4038E−03 | 1.4459E−03 |
| R2 | −1.4988E−02 | −2.4914E−03 | 4.8660E−04 | 3.3473E−03 | 1.0062E−02 | 1.6722E−02 | 1.6801E−02 | 1.0059E−02 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R1 | −1.8164E−04 | −5.1026E−05 | −6.4671E−06 | 0.0000E+00 | 0.0000E+00 | 0.0000E+00 | 0.0000E+00 | 0.0000E+00 |
| R2 | −1.0991E−03 | −3.2008E−04 | −3.8833E−05 | 0.0000E+00 | 0.0000E+00 | 0.0000E+00 | 0.0000E+00 | 0.0000E+00 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |

Figure 8:
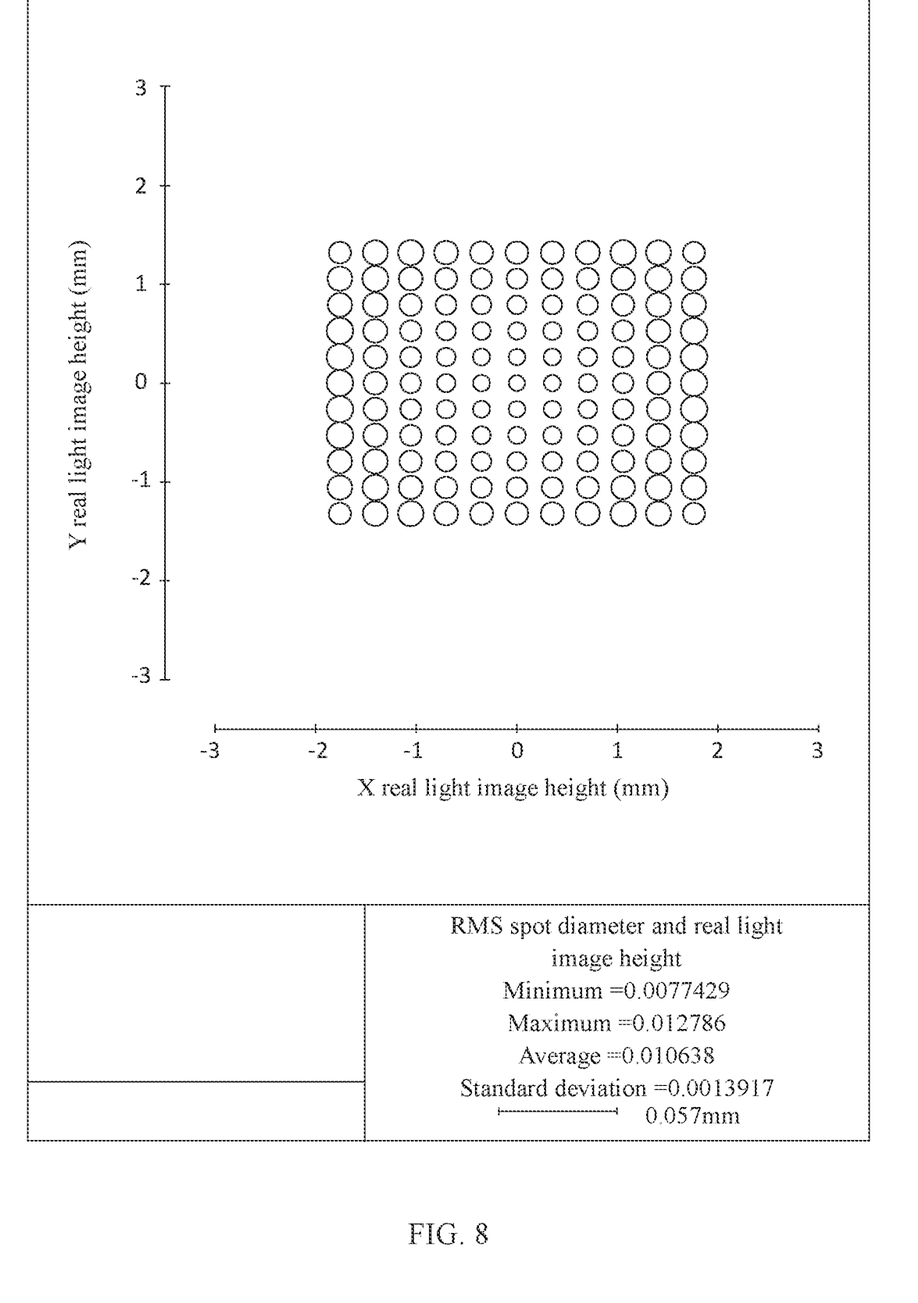
FIG. 8 illustrates a situation where an RMS spot diameter of the camera optical lens shown in FIG. 1 is within a first quadrant.

FIG. 8 illustrates a situation where an RMS spot diameter of the camera optical lens 40 according to Embodiment 4 is within a first quadrant. According to FIG. 8, it can be seen that the camera optical lens 40 according to Embodiment 4 can achieve good imaging quality.

The numerical values corresponding to the various parameters and the parameters specified in the conditions in this embodiment are listed in Table 13. It can be seen that the imaging optical system according to this embodiment satisfies the above-mentioned condition.

In this embodiment, an entrance pupil diameter ENPD of the camera optical lens is 3.969 mm, the full field of view image height IH (in a diagonal direction) is 4.400 mm, the image height in an x direction is 3.520 mm, the image height in a y direction is 2.640 mm, and the imaging effect is the best in this rectangular area; the FOV in the diagonal direction is 29.14°, the FOV in the x direction is 23.49°, and the FOV in the y direction is 17.73°. The camera optical lens 40 satisfies the design requirements of a long focal length and ultra-thinness, its on-axis and off-axis color aberrations are sufficiently corrected, and the camera optical lens has excellent optical characteristics.

TABLE 13

| Parameters and conditions | Embodiment 1 | Embodiment 2 | Embodiment 3 | Embodiment 4 |
|---|---|---|---|---|
| f3/f | 1.18 | 1.18 | 0.86 | 0.53 |
| R7/R8 | 1.59 | 1.64 | 3.91 | 31.81 |
| f | 5.897 | 5.739 | 8.850 | 8.850 |
| f1 | 2.950 | 2.917 | 3.537 | 3.474 |
| f2 | −3.042 | −3.036 | −4.769 | −4.296 |
| f3 | 6.938 | 6.753 | 7.647 | 4.714 |
| f4 | −20.627 | −18.289 | −3.997 | −3.504 |
| f5 | −8.562 | −8.294 | 42.814 | −23.256 |
| FNO | 2.40 | 2.40 | 2.23 | 2.23 |
| TTL | 5.847 | 5.689 | 7.809 | 7.811 |
| IH | 5.000 | 5.000 | 4.400 | 4.400 |
| FOV | 45.16° | 45.90° | 27.43° | 29.14° |

It should be understood by those skilled in the art that the above embodiments are merely some specific embodiments of the present invention, and various changes in form and details may be made without departing from the scope of the present invention.

What is claimed is:

1. A camera optical lens, comprising, from an object side to an image side:
    a first lens having a positive refractive power;
    a second lens a negative refractive power;
    a third lens having a positive refractive power;
    a fourth lens having a negative refractive power; and
    a fifth lens,
    wherein at least one of the first lens to the fifth lens has a free-form surface, and the camera optical lens satisfies following conditions:

$0.50 \le f3/f \le 1.20$; and $1.50 \le R7/R8$, where f denotes a focal length of the camera optical lens, f3 denotes a focal length of the third lens, R7 denotes a central curvature radius of an object side surface of the fourth lens, and R8 denotes a central curvature radius of an image side surface of the fourth lens.

2. The camera optical lens as described in claim 1, further satisfying a following condition:

$2.50 \le d1/d2 \le 15.00$, where d1 denotes an on-axis thickness of the first lens, and d2 denotes an on-axis distance from an image side surface of the first lens to an object side surface of the second lens.

3. The camera optical lens as described in claim 1, further satisfying following conditions:

$0.20 \le f1/f \le 0.76$;

$-1.47 \le (R1+R2)/(R1-R2) \le -0.31$; and $0.08 \le d1/TTL \le 0.36$, where f1 denotes a focal length of the first lens, R1 denotes a central curvature radius of an object side surface of the first lens, R2 denotes a central curvature radius of an image side surface of the first lens, d1 denotes an on-axis thickness of the first lens, and TTL denotes a total optical length from the object side surface of the first lens to an image plane of the camera optical lens along an optic axis.

4. The camera optical lens as described in claim 1, further satisfying following conditions:

$-1.08 \le f2/f \le -0.32$;

$0.10 \le (R3+R4)/(R3-R4) \le 064$; and $0.02 \le d3/TTL \le 0.06$, where f2 denotes a focal length of the second lens, R3 denotes a central curvature radius of an object side surface of the second lens, R4 denotes a central curvature radius of an image side surface of the second lens, d3 denotes an on-axis thickness of the second lens, and TTL denotes a total optical length from an object side surface of the first lens to an image plane of the camera optical lens along an optic axis.

5. The camera optical lens as described in claim 1, further satisfying following conditions:

$-0.71 \le (R5+R6)/(R5-R6) \le 1.58$; and $0.03 \le d5/TTL \le 0.13$, where R5 denotes a central curvature radius of an object side surface of the third lens, R6 denotes a central curvature radius of an image side surface of the third lens, d5 denotes an on-axis thickness of the third lens, and TTL denotes a total optical length from an object side surface of the first lens to an image plane of the camera optical lens along an optic axis.

6. The camera optical lens as described in claim 1, further satisfying following conditions:

$-7.00 \le f4/f \le -0.26$;

$0.53 \le (R7+R8)/(R7-R8) \le 6.60$; and $0.02 \le d7/TTL \le 0.10$, where f4 denotes a focal length of the fourth lens, d7 denotes an on-axis thickness of the fourth lens, and TTL denotes a total optical length from an object side surface of the first lens to an image plane of the camera optical lens along an optic axis.

7. The camera optical lens as described in claim 1, further satisfying following conditions:

$-5.26 \le f5/f \le 7.26$;

$-3.24 \le (R9+R10)/(R9-R10) \le 10.20$; and $0.04 \le d9/TTL \le 0.17$, where f5 denotes a focal length of the fifth lens, R9 denotes a central curvature radius of an object side surface of the fifth lens, R10 denotes a central curvature radius of image side surface of the fifth lens, d9 denotes an on-axis thickness of the fifth lens, and TTL denotes a total optical length from an object side surface of the first lens to an image plane of the camera optical lens along an optic axis.

8. The camera optical lens as described in claim 1, further satisfying a following condition:

$f/TTL \ge 1.00$ where TTL denotes a total optical length from an object side surface of the first lens to an image plane of the camera optical lens along an optic axis.

9. The camera optical lens as described in claim 1, wherein a total optical length from an object side surface of the first lens to an image plane of the camera optical lens along an optic axis is smaller than or equal to 8.59 mm.

10. The camera optical lens as described in claim 1, wherein an F number of the camera optical lens is smaller than or equal to 2.47.

* * * * *